E. MORROW.
FENCE WIRE STRETCHER.
APPLICATION FILED FEB. 24, 1914.
1,168,098.
Patented Jan. 11, 1916.
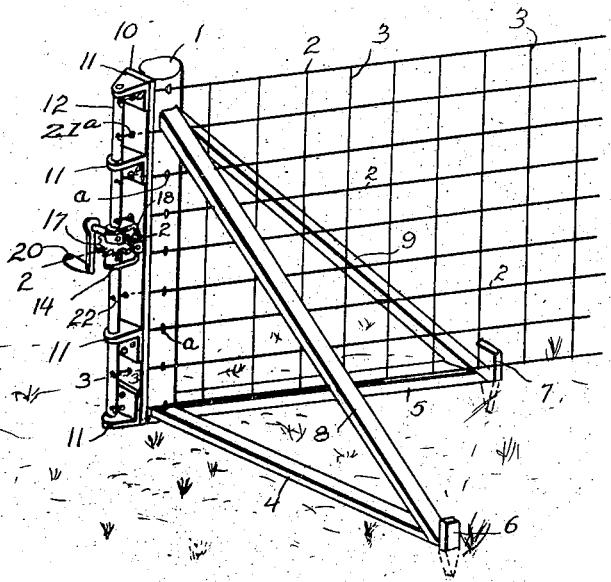
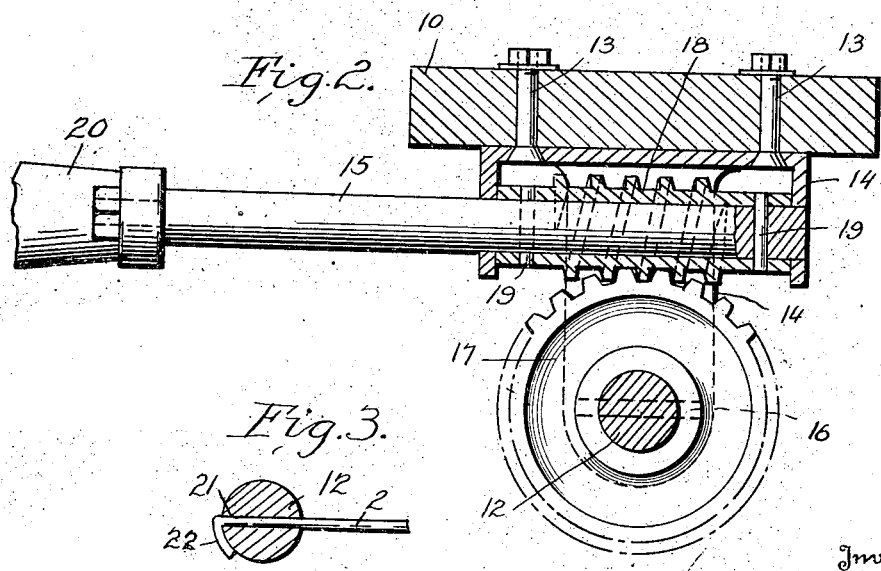
Inventor
E. Morrow.

UNITED STATES PATENT OFFICE.

EPHRAIM MORROW, OF BAKERSTOWN, PENNSYLVANIA.

FENCE-WIRE STRETCHER.

1,168,098. Specification of Letters Patent. Patented Jan. 11, 1916.

Application filed February 24, 1914. Serial No. 820,668.

*To all whom it may concern:*

Be it known that I, EPHRAIM MORROW, a citizen of the United States, residing at Bakerstown, in the county of Allegheny and State of Pennsylvania, have invented certain new and useful Improvements in Fence-Wire Stretchers; and I do hereby declare the following to be a full, clear, and exact description of the invention, such as will enable others skilled in the art to which it appertains to make and use the same.

This invention relates to fence wire stretchers, and one of the principal objects of the invention is to provide simple, reliable and efficient means for uniformly stretching the line wires of a fence, and to provide a device for the purpose referred to which will stretch all the line wires simultaneously and equally.

Another object of the invention is to provide a fence wire stretcher which will stretch the longitudinal or line wires of the fence uniformly on the sides of a hill, in a hollow, or over the top of a hill, and to insure the top line wire and the bottom line wire as well as the intermediate wires an equal tension to form a stiff and rigid fence.

These and other objects may be attained by means of the construction illustrated in the accompanying drawing, in which, Figure 1 is a perspective view of a fence wire stretcher shown in use and made in accordance with this invention, Fig. 2 is a sectional view taken on the line 2—2 of Fig. 1 and showing the worm and connected parts in section, Fig. 3 is a sectional view of the winding shaft taken on the line 3—3 of Fig. 1.

Referring to the drawing, the numeral 1 designates a fence post, 2 are the line wires of the fence and 3 are vertical strands. The fence post 1 is braced by means of the horizontal ground line braces 4 and 5 disposed at right angles one to the other and held firmly against the ground line of the post 1 by stakes 6—7 driven into the ground. Inclined braces 8 and 9 are fitted at their upper ends in a notch in the fence post 1, while their lower ends abut against the stakes 6 and 7, thus holding the post 1 firmly in position.

The fence wire stretcher comprises a base 10, preferably formed of hard wood, and secured to said base are the bearing brackets 11 for the winding shaft 12. Secured centrally to the base 10 by bolts 13 is a supporting bracket 14 for the winding shaft 12, and for the worm or crank shaft 15.

Fitted on the winding shaft 12, and held by means of a pin 16 is a worm gear wheel 17. A worm 18 is connected to the crank shaft 15 by means of pins 19, and the teeth of the worm gear wheel 17 engage the grooves in the worm 18, and when the worm is rotated by means of the handle 20, the winding shaft 12 will be rotated to stretch the line wires 2, said wires being extended through openings 21ª in the base and openings 21 in the winding shaft and then bent as shown at 22 in Fig. 3.

The operation of the fence wire stretcher may be briefly described as follows: One or more of the vertical strands 3 may be removed, and the ends of the line wires 2 are extended through the openings 21ª in the base and openings 21 in the winding shaft 12, and the ends 22 are bent down as shown in Fig. 3. Staples *a* may be partially driven into the posts over the line wires. By turning the crank 20 the line wires 2 are equally stretched and when sufficiently taut, the staples *a* may be driven home into the post and the stretcher removed to the next point of operation.

From the foregoing it will be obvious that the line wires will be uniformly stretched, and that the upper and lower line wires when passing over a hill or down into a hollow will be stretched properly to form a stiff and tight fence.

Various changes may be made in the details of construction without departing from the spirit and scope of the invention as defined in the claim.

What is claimed is:

The herein described fence wire stretcher comprising a vertically disposed base member connected to a fence post and extending from end to end thereof and provided with annular brackets extending at right angles to the base, said brackets being spaced apart and disposed near the top and bottom of the base, said base also provided with a plurality of openings, a winding shaft mounted in said brackets, a worm gear disposed centrally on said shaft, said shaft having perforations therein in alinement with the openings in the base through which the line wires of the fence extend, a bearing bracket including relatively long spaced ears having vertically alined apertures rotatably receiving said winding shaft and relatively short spaced ears having horizontally alined apertures, a crank shaft mounted to rotate in the relatively short ears, a worm on said crank shaft disposed between said short ears, and a crank handle for operating the winding shaft.

In testimony whereof I affix my signature in presence of two witnesses.

EPHRAIM MORROW.

Witnesses:
E. P. BARRINGER,
CHAS. M. BIRCKHEAD.